Oct. 13, 1942.     H. RICHARDSON     2,298,967
LIQUID WEIGHING APPARATUS
Filed July 27, 1938     12 Sheets-Sheet 1
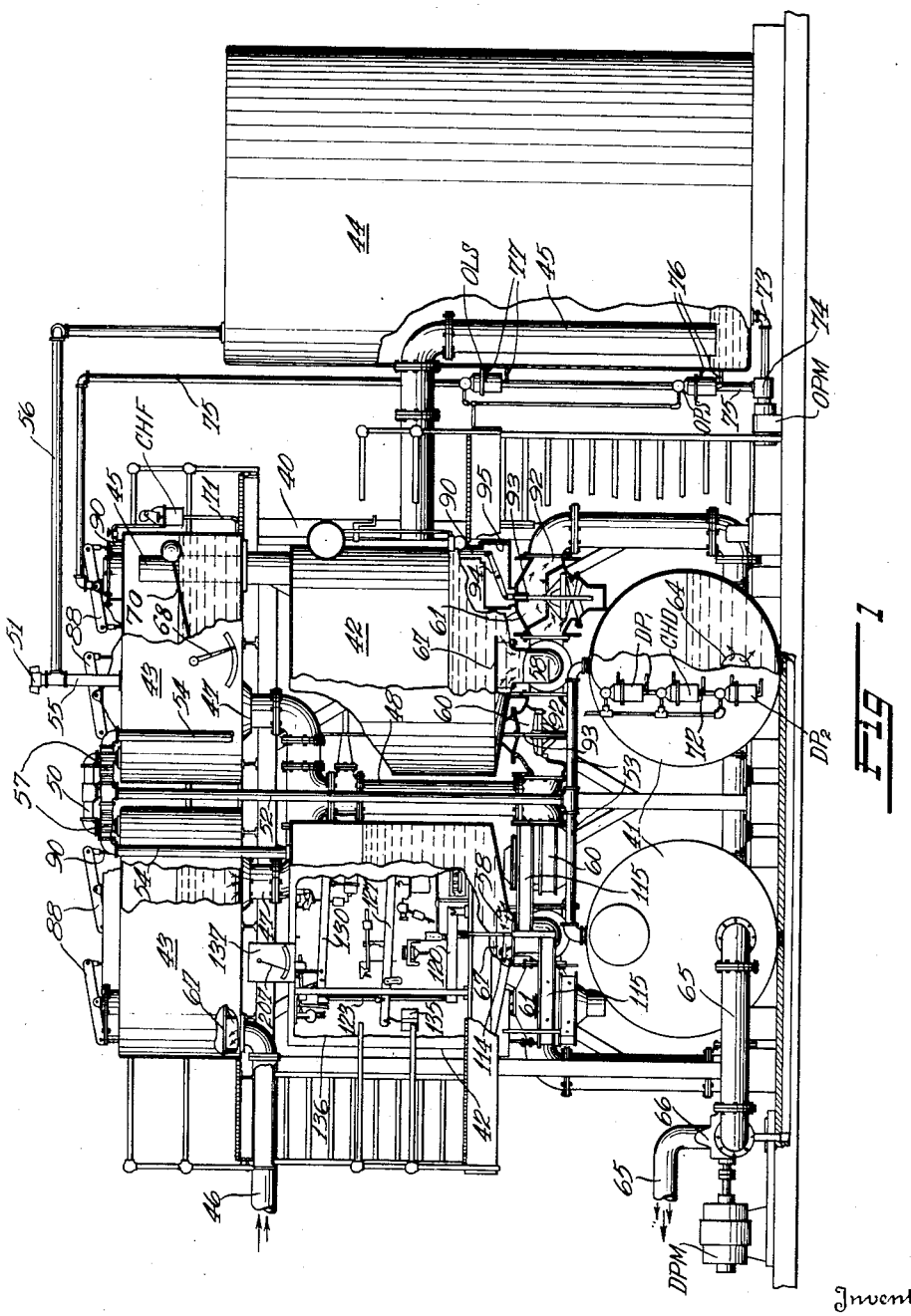
Inventor
Henry Richardson,
By Norris & Bateman
Attorneys

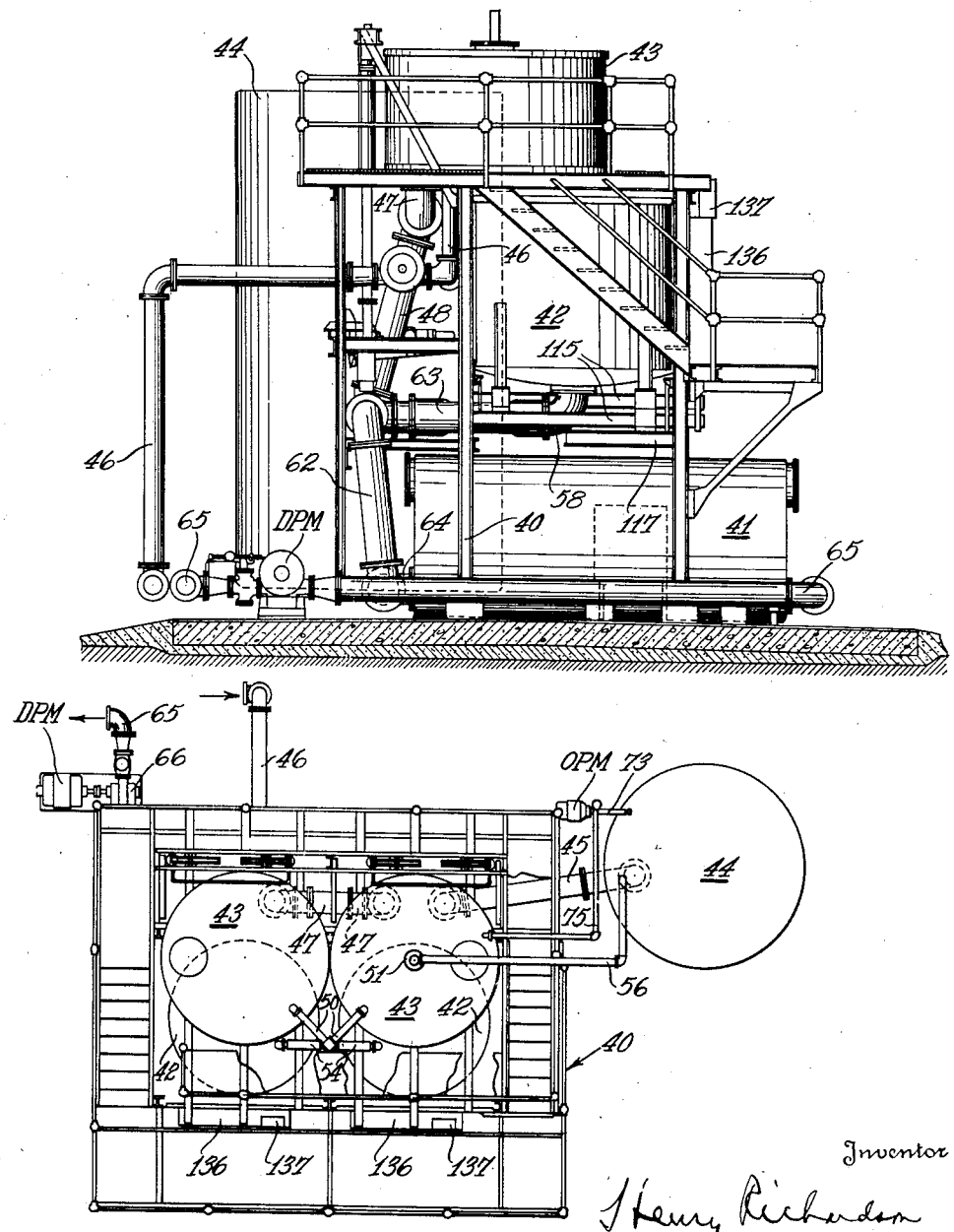

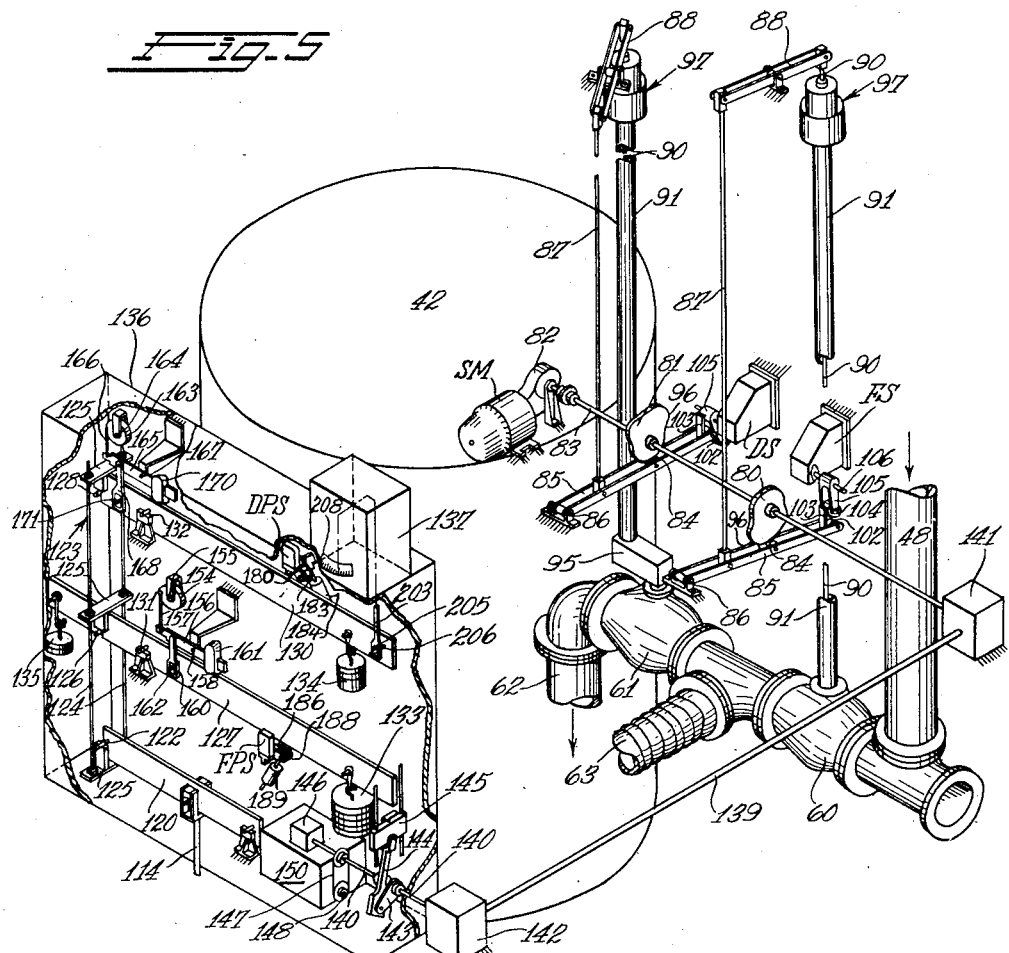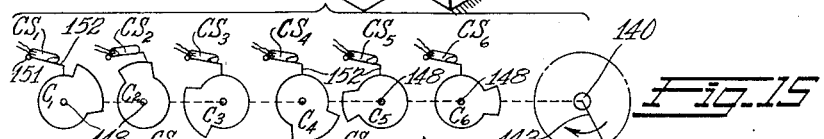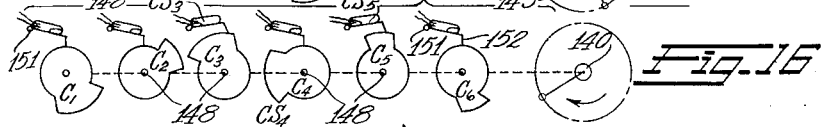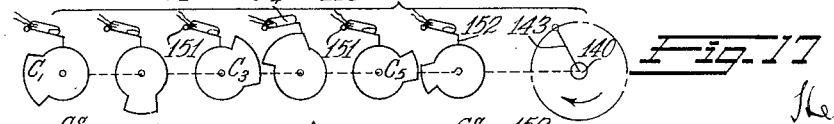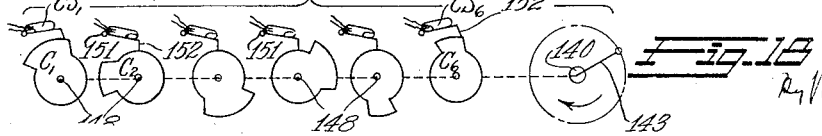

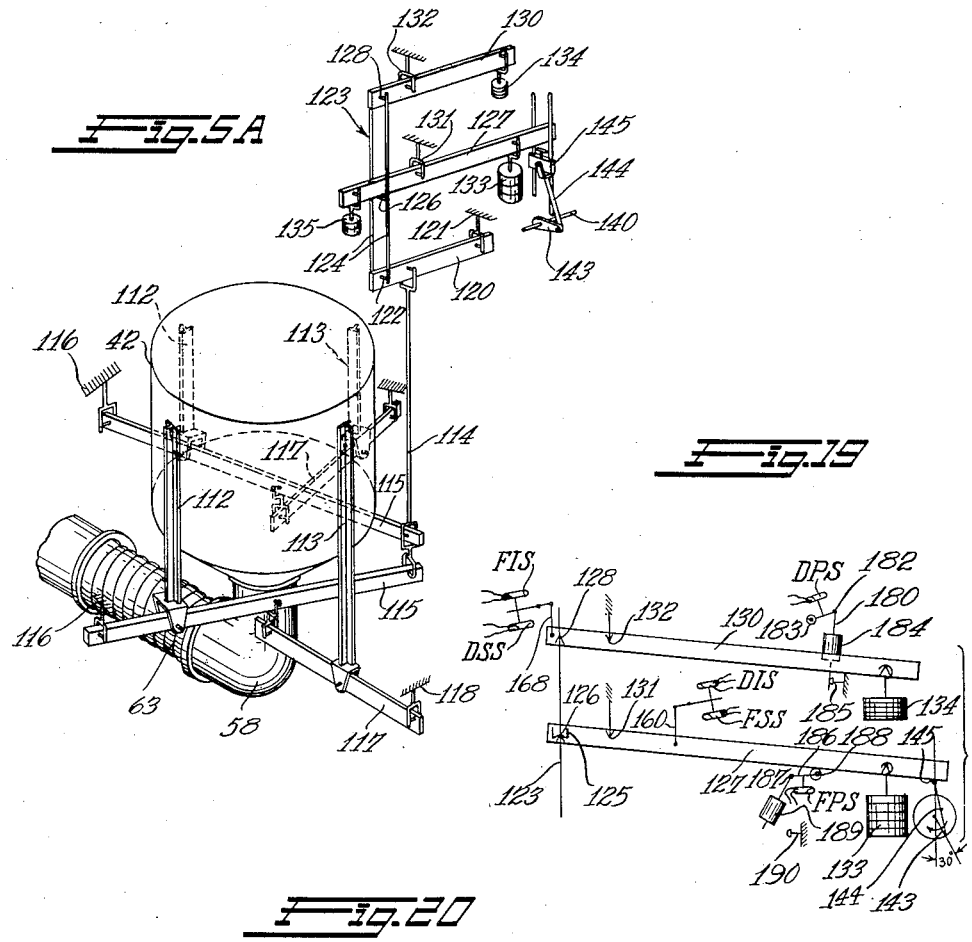

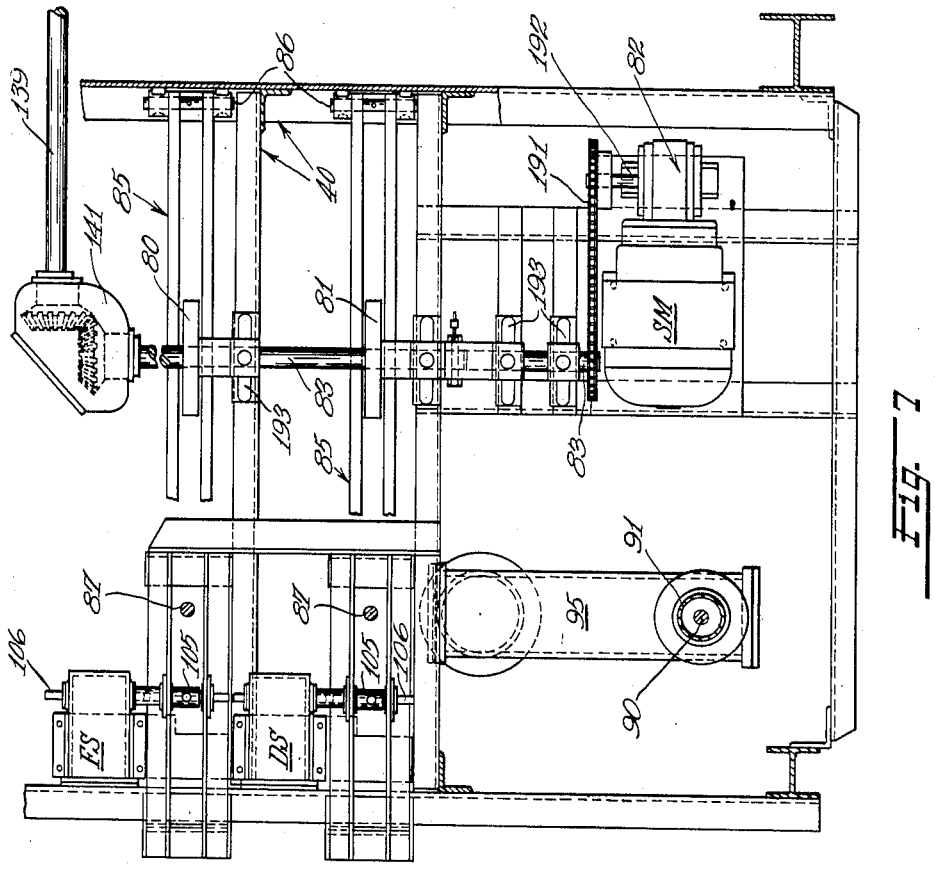
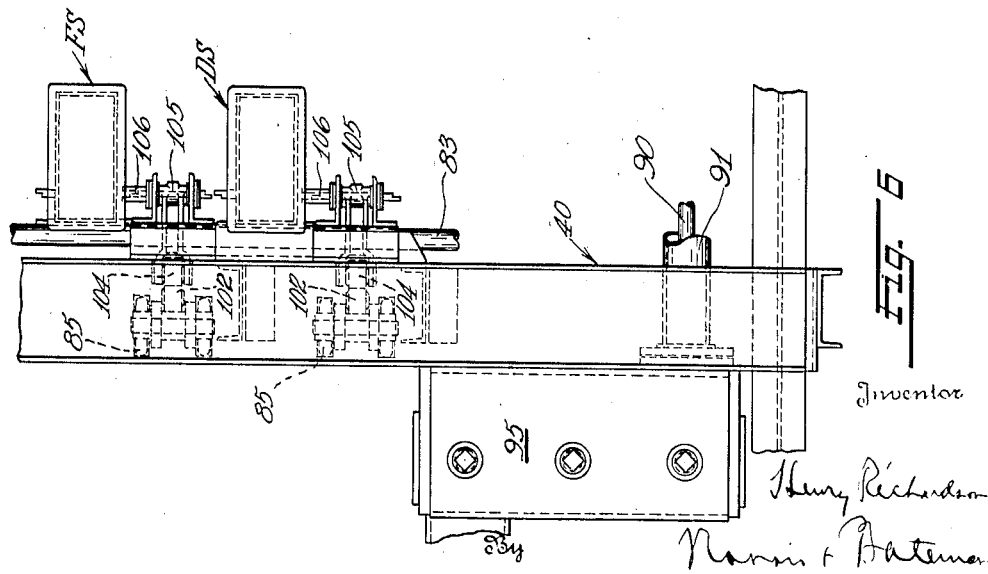

Oct. 13, 1942.                H. RICHARDSON                2,298,967
                          LIQUID WEIGHING APPARATUS
                            Filed July 27, 1938              12 Sheets-Sheet 7
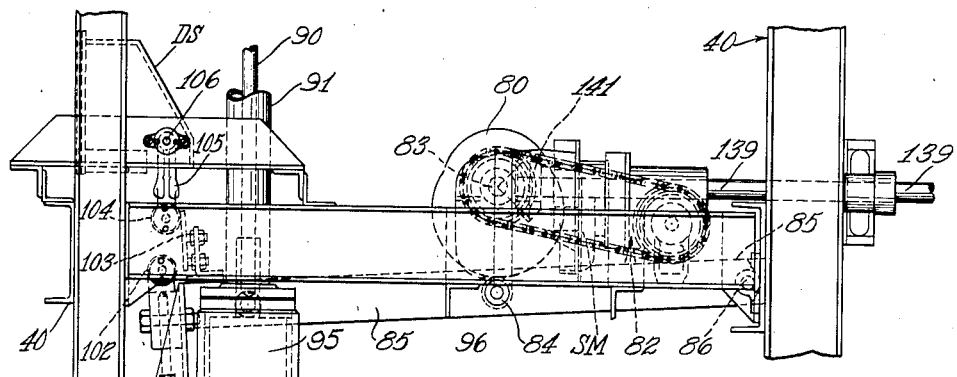
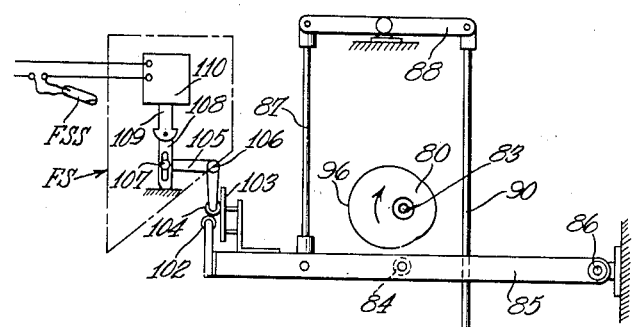
Fig. 8
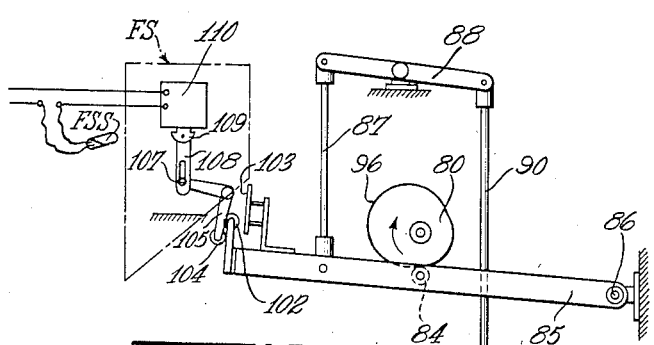
Fig. 9
Fig. 10
Inventor
H. Henry Richardson
By Norris & Bateman
Attorneys Oct. 13, 1942.  H. RICHARDSON  2,298,967
LIQUID WEIGHING APPARATUS
Filed July 27, 1938   12 Sheets-Sheet 8
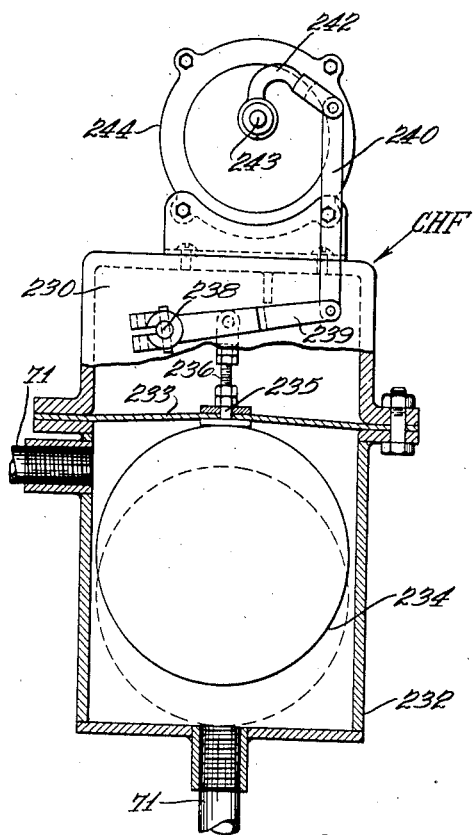
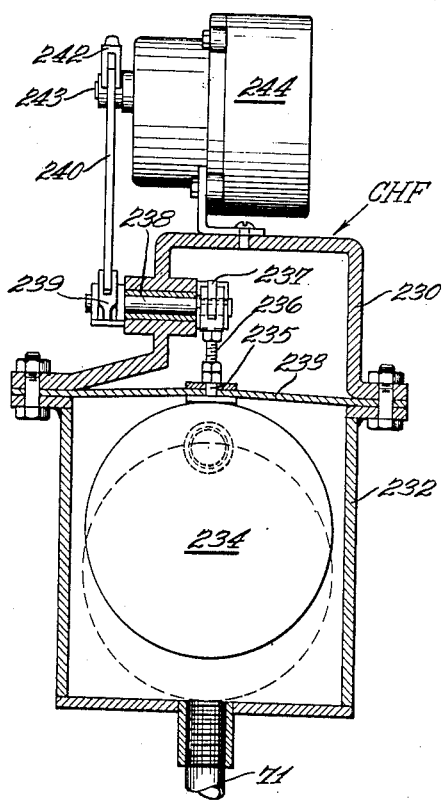
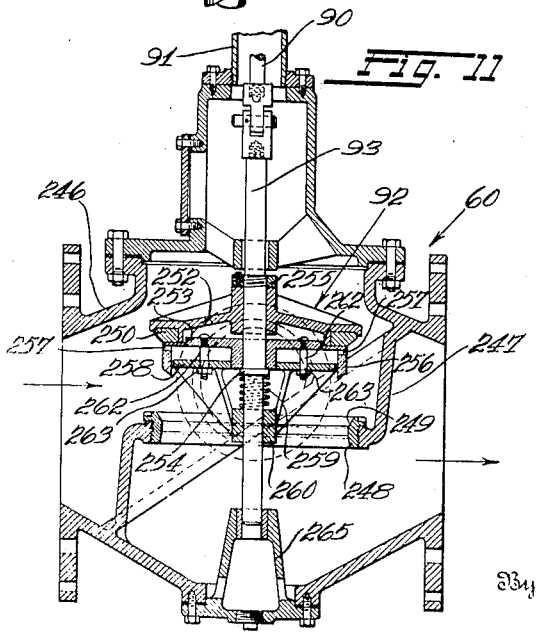
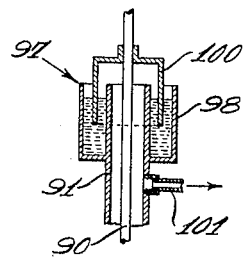

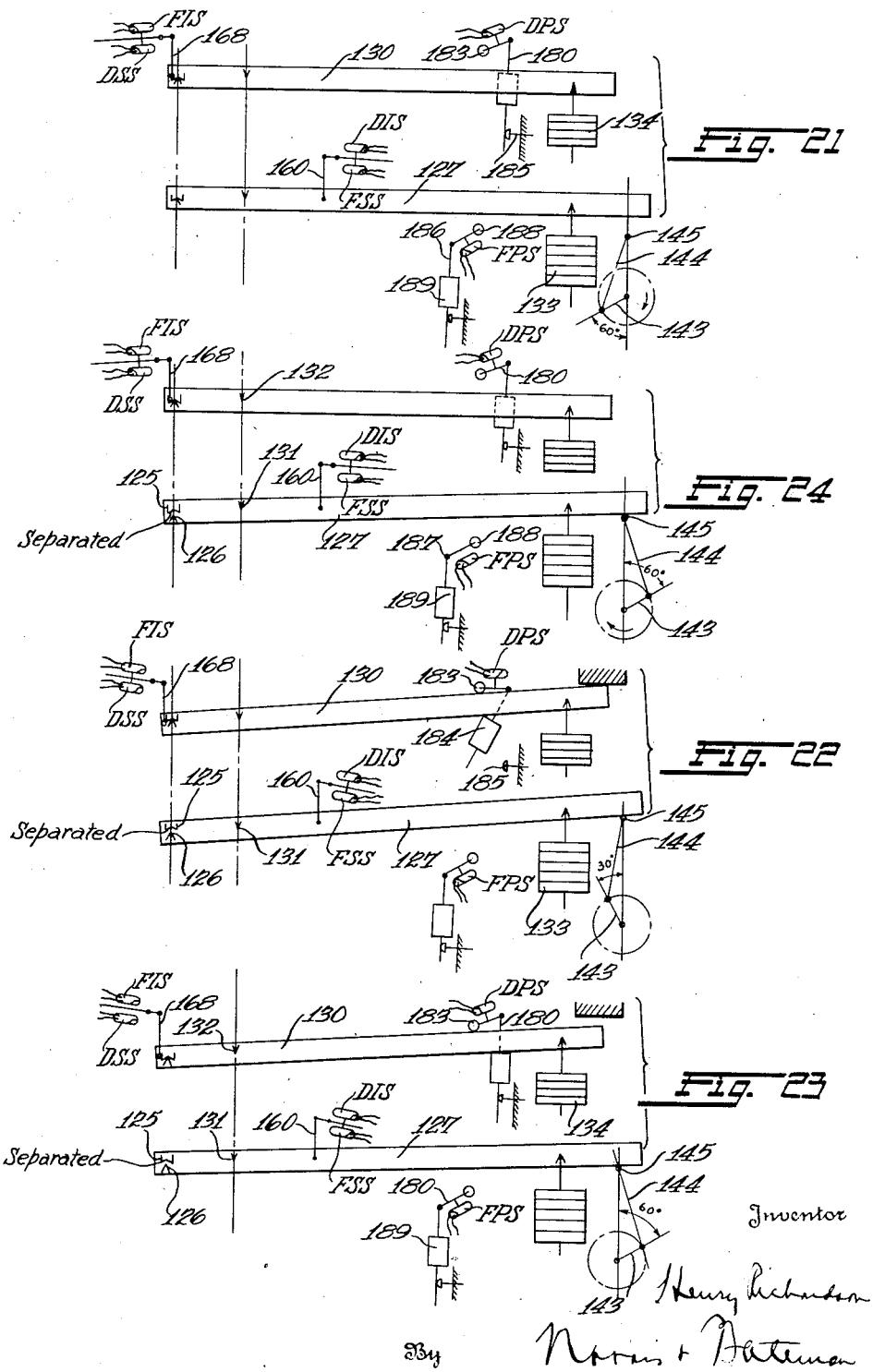

Oct. 13, 1942.   H. RICHARDSON   2,298,967
LIQUID WEIGHING APPARATUS
Filed July 27, 1938    12 Sheets-Sheet 10
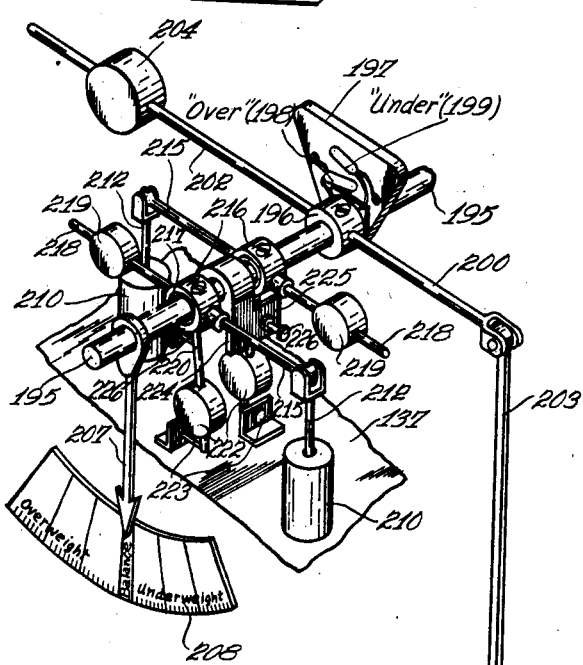
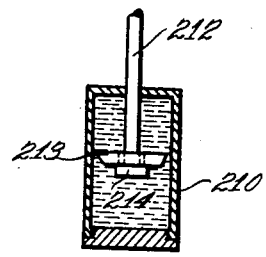
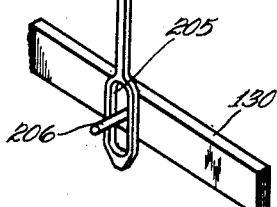
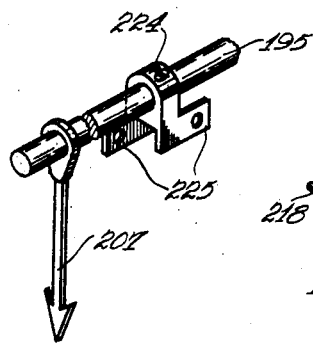
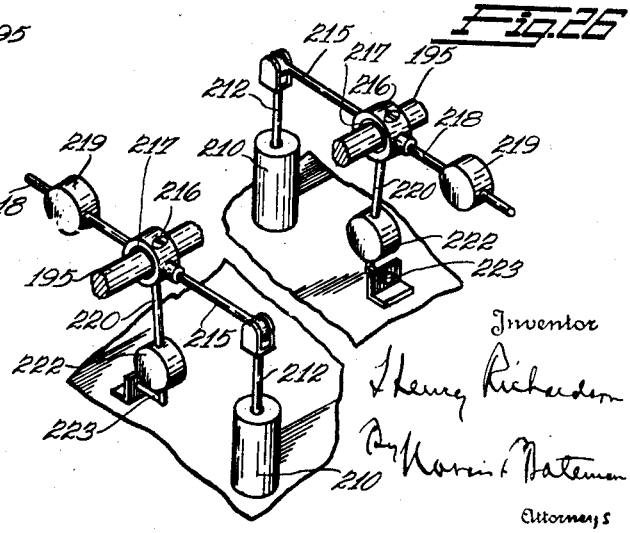

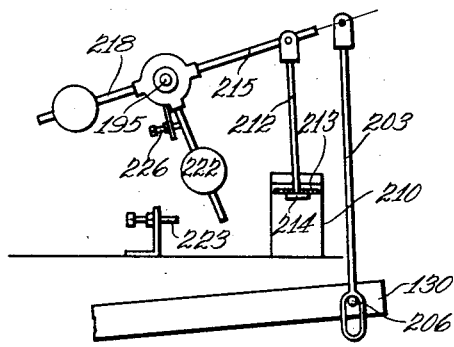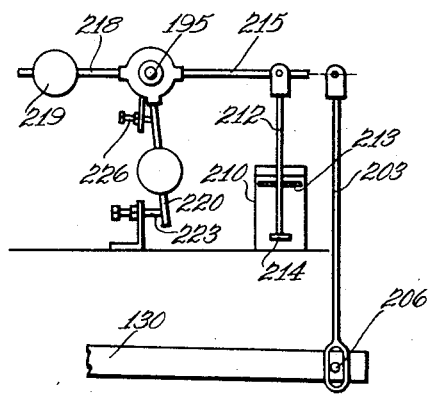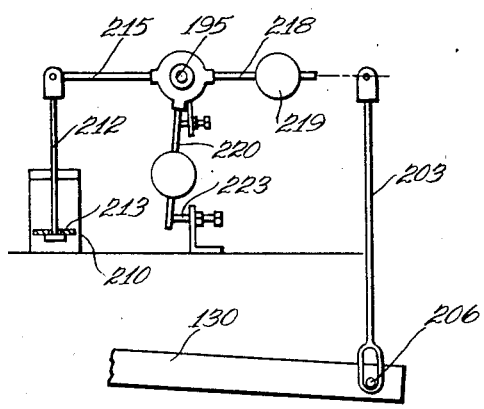

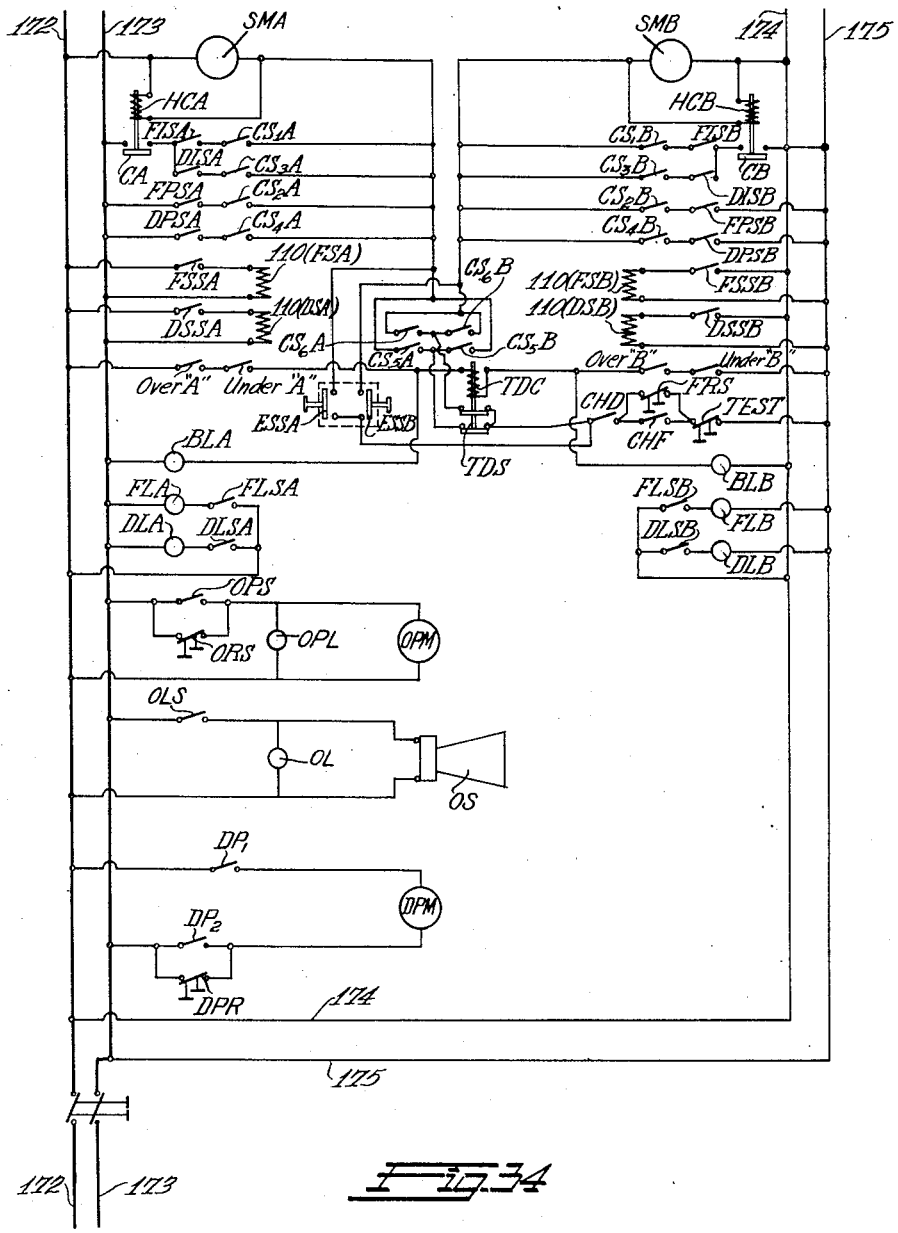

Patented Oct. 13, 1942

2,298,967

UNITED STATES PATENT OFFICE 2,298,967

LIQUID WEIGHING APPARATUS

Henry Richardson, Passaic, N. J., assignor to Richardson Scale Company, Clifton, N. J., a corporation of New Jersey Application July 27, 1938, Serial No. 221,617

16 Claims. (Cl. 249—26)

The present invention relates to apparatus for rapidly and accurately weighing or measuring liquids, and particularly to a heavy duty machine for auomatically weighing and registering large units of liquid while maintaining a substantially continuous flow of the liquid from its source through the machine and to a point of use or storage.

More specifically, the machinery of this invention is designed primarily to serve as an automatically operable scale for weighing gasoline, oil or other volatile and inflammable fluid as it is pumped from ship to shore or from any source to storage.

In prior apparatus of this general type, embodying one or more tanks through which liquids are passed for weighing of for measurement, errors are introduced when liquids of appreciable viscosity are handled, due to adherence of some of the liquid to the walls and bottom of the tank. Such errors, furthermore, obviously are variable with temperature conditions. It is the primary object of the present invention to avoid such errors, not by approximated mathematical calculation or mechanical compensation but by so designing the weighing apparatus that it discharges units of liquid in such manner that they can not vary from a predetermined value. This is accomplished by a multiple-beam scale system so coordinated with the control valves of a weigh tank that there is always a residue of liquid in the tank after discharge. This residue, together with the tank, constitutes a tare which is carried in balance by a "tare" beam of the scale system; and a "weigh" beam is provided and so related to the tare beam that units of liquid are weighed into and out of the tank accurately.

It is another major object of the present invention to devise a scale system that is far greater in accuracy in the weighing of liquids than any apparatus heretofore proposed for the purpose. Aside from the avoidance of error due to viscosity, the present scale system embodies several arrangements for reducing errors to an absolute minimum. In fact, the apparatus of this invention has been found capable of weighing within an average accuracy of $\frac{1}{10}$ of 1% of the true weight of any one hundred discharged units. Some of the factors contributing to such accuracy are expressed in the following objects.

It is an object of this invention to feed the weigh tanks or tanks from a feed tank or tanks interposed between the weigh tank and the liquid source and containing a substantially constant head of the liquid. In this connection it is also an object to discharge the weighed liquid into a receiving tank or tanks while maintaining a substantially constant head of liquid in the latter.

Another important object resides in the provision of valve means and operating mechanism therefor which will handle a large volumetric flow of liquid and yet cut the flowing liquid accurately into weighed units.

A further object is to provide an overweight and underweight device for preventing discharge of any unit of material which does not have a predetermined weight within the prescribed tolerance (permissible range of very slight inaccuracy—plus or minus) of the weighing machine.

Preferably, in order to obtain a practically unbroken stream of liquid through the machine, two weigh tanks are provided and operated in timed relationship but out of phase—that is, so that one tank discharges while the other is fed, and vice versa. It is a major object of the present invention to devise a much improved system of this general character and, in particular, to provide an electric interlocking arrangement for automatically bringing the twin scale units into step or alternation and maintaining them in such relationship.

The electric arrangement preferably includes a time delay relay for permitting the scale to come to proper balance for each weighing prior to operation of the weigh tank control valves. It further includes various elements for preventing improper operation, and various indicators and signals, all of which will be described in detail subsequently.

It is a highly important object of the present invention to devise a quickly and easily adjustable valve, for use in a system of the character described, having a dribble flow as well as full flow and cut-off positions of adjustment. In particular it is an object to provide a pair of such valves, for feeding and discharging respectively in association with a weigh tank that must be balanced twice on a multiple-beam scale system as each unit of liquid passes through the tank. Still more specifically, it is an object to provide, a dual scale system, two sets of pairs of such valves in association with means for automatically moving the valves in properly timed relationship to their several positions so that a substantially unbroken stream of liquid is divided accurately into measured or weighed units.

It is a further major object of this invention to device an apparatus, of the general character described, which is especially adapted to handle volatile and inflammable liquids. In this connection, subordinate objects reside in the provision of a completely closed pipe and tank system, with the flow into each tank of the system taking place at a point of submersion; in the provision of fume seals for the actuators which extend inwardly to the valves of the liquid handling system, and of interconnections between the upper ends of the tanks of the system, without normally venting the interconnected tanks to atmosphere; and in the provision of electric motors that are explosion-proof, and various sealed and explosion-proof electrical units in association with said motors.

The objects stated and expressed in the foregoing discussion, and other and more specific objects as well, will clearly appear from the following detailed description when studied in conjunction with the accompanying drawings and the appended claims. In the drawings, which illustrate a single embodiment that is preferred for handling a large volumetric flow of volatile liquids such as gasoline, oils and the like:

Fig. 1 represents a front elevational view of the complete apparatus, with portions of certain parts broken away or sectioned for clarity of illustration;

Fig. 2 is a side elevation as seen when looking toward the left-hand end of Fig. 1;

Fig. 3 is a top plan view of the apparatus of Figs. 1 and 2;

Fig. 5 is a perspective and somewhat diagrammatic view designed to clarify the relationships of the major parts of one of the twin scale units;

Fig. 5A is a similar view designed to clarify the relationship of one of the multi-beam systems to its corresponding weigh tank;

Figs. 6, 7 and 8 are detail views representing, respectively, a front elevational view (rotated 90 degrees to the right), and plan and side elevational showings of one of the scale motors and its associated valve operating mechanism;

Figs. 9 and 10 are diagrammatic showings of one of the liquid control valves and its actuating means, in dribble flow and cut-off positions respectively;

Fig. 11 is an enlarged detail view, in vertical section, of one of the control valves;

Fig. 12 is a detail view, in vertical section, of one of the fume seal devices for permitting operation of the valves without escape of gases;

Figs. 13 and 14 are front and side elevational views respectively, each in partial section, of a device responsive to variations in liquid level and forming part of the apparatus of Figs. 1 to 4;

Figs. 15 to 18 are schematic illustrations of four effective positions of a scale beam lift mechanism and the corresponding positions of a set of six switch-actuating cams that are synchronized with said lift mechanism;

Figs. 19 to 24 are schematic illustrations of six different positions of one of the tare and weigh beam assemblies and the corresponding positions of a plurality of switches and of said beam lifting mechanism;

Fig. 25 is an enlarged detail view, in perspective, of what will hereafter be referred to as an "over-under device" for ensuring that all measured units of liquid will have a weight within a prescribed tolerance;

Figure 4:
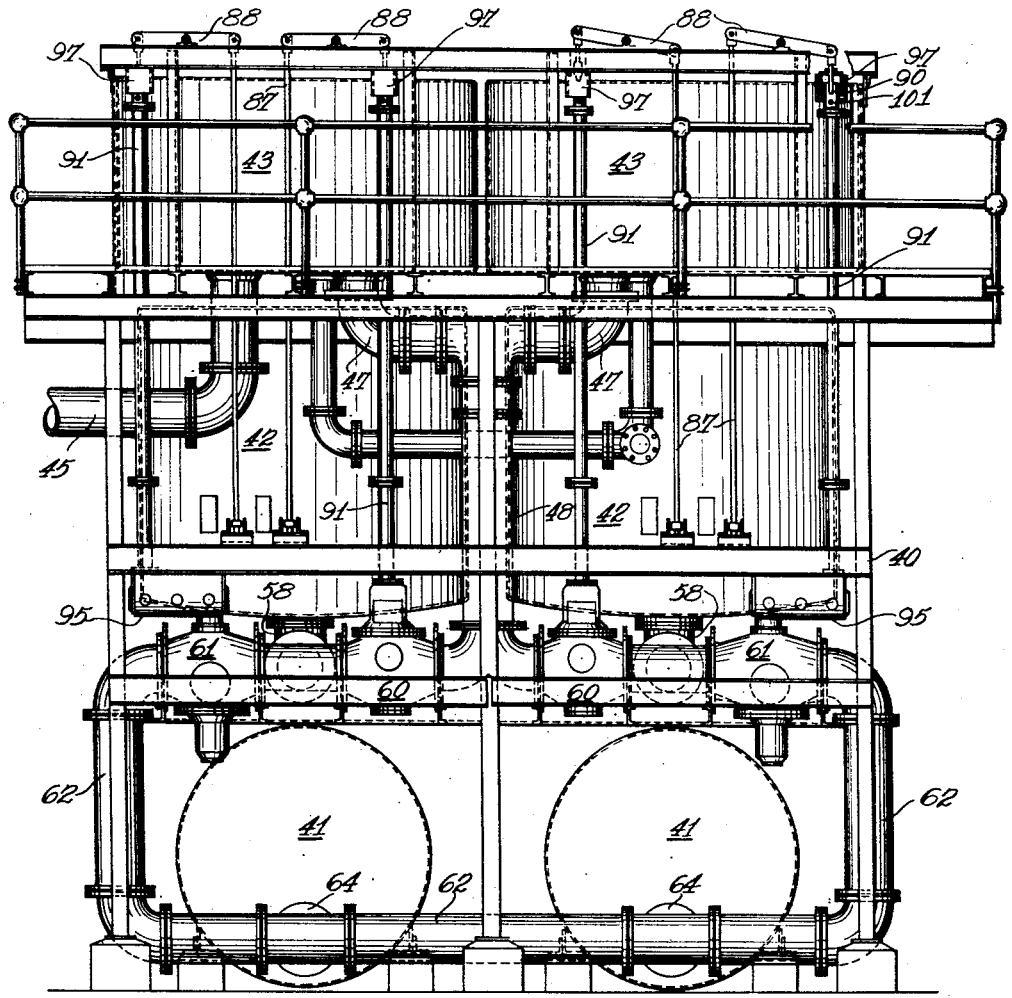
Fig. 4 is a rear elevational view, with the overflow tank detached.

Fig. 26 differs from Fig. 25 only in the removal of certain parts and the spacing of others to obtain clarity of illustration;

Fig. 27 is a fragmentary detail view of a portion of the device of Fig. 25;

Fig. 28 is a fragmentary section of one of the dash-pots of Figs. 25 and 26;

Figs. 29 to 33 are diagrammatic illustrations of various positions assumed by one of the over-under devices in response to movements of the associated tare beam;

Fig. 34 is a wiring diagram including circuits and controls for both sides of the illustrated dual-scale system.

With continued reference to the drawings, wherein like characters are employed to designate like parts, and with particular reference for the moment to Figs. 1 to 4, the framework, tanks and piping arrangements of the system will first be described. A framework 40—comprising a plurality of intertied elements, ladders and platforms, as shown—supports a pair of receiving tanks 41, a pair of weigh tanks 42 and a pair of feed tanks 43, each pair superposed above the other in the order named. For alternated weighings with twin scales it is essential that there be two tanks 42, but single large feed and receiving tanks would suffice. The latter are formed in pairs only for convenience of manufacture, shipment and installation. There is also an overflow tank 44, connected by a pipe 45 to one of the feed tanks in such manner that an excessively high level of liquid can not be attained in the latter.

A pipe line 46 supplies, let us say, gasoline from a tanker to one of the feed tanks 43. In effect it supplies both tanks as they are constantly interconnected through discharge branches 47 which feed into a common discharge conduit 48. The tops of these tanks also are interconnected, by a pipe 50, so that vapor pressures are equalized. In fact, the upper parts of the interiors of all seven tanks are interconnected to have a common fume or vapor vent valve 51 which may be adjusted to open to atmosphere at any preselected abnormal pressure. This is accomplished by a vertical pipe 52 connected into the pipe 50, branch pipes 53 leading from tanks 41 to pipe 52, branch pipes 54 leading from tanks 42 to pipe 52, a pipe section 55 between the valve 51 and one of the tanks 43, and a pipe 56 connected between the overflow tank 44 and the section 55. All tanks are closed to atmosphere except for possible relief through valve 51, and thus have their vapor spaces in intercommunication. Therefore, danger is eliminated, and losses by evaporation are minimized.

The pipe branches 54 contain flexible sections 57 of oil-proof synthetic rubber or the like so as not to impose appreciable resistance to rising and falling movements of the weigh tanks 42 to which the pipe branches 54 are rigidly connected. Each weigh tank is mounted on an individual scale system (later described) and hence must be free for such movements. All other tanks are rigidly mounted. Each weigh tank has a single central connection 58 in its bottom through which both feeding and discharging takes place, alternately, depending upon the position assumed by a feed valve 60 disposed between each connection 58 and the feed conduit 48 and upon the position of a discharge valve 61 disposed between each connection 58 and a pipe line 62 that is connected to the rear end of each receiving tank 41. In a manner explained later the operation of the two pairs of valves, 60, 61, is timed so that the feed valve of one weigh tank is open while that of the other is closed, the same being true of the respective discharge valves. And of course each discharge valve is closed while its associated feed valve is open, and vice versa (see Fig. 1).

The connections 58 include tubular sections 63 that are formed of oil-proof synthetic rubber and that are flexible vertically as well as capable of slight longitudinal contraction and expansion. Hence they impose no appreciable resistance to vertical movement of the weigh tanks.

The pipe 62 connects to the receiving tanks 41 adjacent the bottoms thereof, at 64; and the liquid in these tanks may be periodically or continuously removed to waiting tank-cars or to a large remote storage tank (not shown) by a pipe line 65 which contains a discharge pump 66 driven by an electric motor DPM.

It should be observed that in each instance the seven closed tanks are fed in submersion—that is, the point of fluid entry is adjacent the tank bottom and normally below the liquid level of the particular tank. This is done to reduce turbulence and vaporization to a minimum. This advantage is augmented by placing baffle plates 67 in some of the tanks (see Fig. 1). It will also be observed that all valves are external for ready accessibility and for avoiding the danger of sending men into the tanks for purposes of inspection and repair.

The common level of liquid in the two feed tanks 43 is indicated by a pointer 68 actuated by a float device 79. Constant head feed switch device CHF (Fig. 1) is connected to the top and bottom of one tank 43 by a conduit 71 and designed to keep a certain electrical circuit open (as explained later in detail) so that the feed valves 60 can not admit fluid to the weigh tanks until a definite head of liquid is reached or exceeded in the feed tanks. This provision increases the accuracy of the weighings. In like manner and likewise for accuracy a constant head discharge device CHD is connected into one of the receiving tanks 41 by a conduit 72 so that a weighed unit of liquid normally cannot be discharged into either tank unless a substantially constant head exists, with the level so predetermined that there is room for the weighed unit in these tanks. A suitable control device of this character is shown in Figs. 13 and 14, described later.

The overflow tank 44 is connected at its bottom by a pipe 73 to a pump 74 which can be utilized to return the liquid to the feed tanks by way of a pipe 75 (Fig. 1). This overflow pump is driven by an electric motor OPM which is so related (as explained in detail later on Fig. 34) to a switch device OPS that the pump is operated automatically whenever the liquid in tank 44 exceeds a given level. The device OPS is connected to the tank by piping 76. A similar switch device OLS, connected to a higher part of tank 44 by piping 77 (Fig. 1), is connected into the electrical circuit of Fig. 34 as explained later so as to light a red lamp OL and operate an overflow siren OS if and when an abnormally high level is reached in the tank 44.

With reference now in particular to Fig. 5 the control valves 60 and 61 of each scale system depend primarily for their actuation upon a pair of cams 80 and 81 respectively and upon a pair of solenoid units FS and DS respectively. An electric scale motor SM operates through a reducing gear unit 82 to drive a shaft 83 upon which the cams are secured. Below each cam there is disposed a roller 84 carried by a lever 85 that is pivoted at one end at 86 upon the framework, as indicated. Between each roller and pivot the lever is pivotally connected to a vertical link 87, the latter in turn being pivotally connected to one end of a small walking beam 88 that is pivoted on the framework between its ends, as shown. The other end of each walking beam is pivotally connected to an elongated valve rod 90 which projects downwardly through a sleeve 91 into connection with a feed valve 60 or a discharge valve 61, as the case may be (see also Fig. 1).

In the case of the feed valve the last named connection is made direct to the shiftable valve unit 92 (Figs. 1 and 11) through a valve stem 93, but for the discharge valve—which unseats downwardly instead of upwardly—the connection is indirect and comprises a small walking beam 94 pivoted between its ends on a housing 95 within which it is disposed. The opposite ends of the beam 94 are pivotally joined to the corresponding rod 90 and stem 93, so that downward movement of the rod will cause closure of the valve. All control valves, therefore, are closed by the weight of the rods 90 augmented by the pressure of the liquid tending to escape through the valves. Upward movement of the rods 90 to open the valves must be positive and is brought about periodically (in a certain timed relation as subsequently seen) by forceful engagement of enlarged portions 96 of the cams 80 with the rollers 84 (Figs. 5, 9 and 10).

The two sleeves 91, that are associated with the feed valves 60, are directly connected to portions of the valve housings, and the other two sleeves connect with the boxes 95 which in turn are connected to the housings of the discharge valves 61. Stuffing glands for the stems of the four control valves are omitted to ensure smooth and facile valve actuation, so that fumes from the liquid may escape in limited quantity into the sleeves 91. Each sleeve has, at its upper end, a fume seal device 97 which does not interfere with the valve actuation. Each device comprises (see Fig. 12) a liquid-filled cup 98 surrounding and joined to the upper end of the sleeve, and an inverted cup 100 secured to the rod 90 in such manner that its open lower edge is always immersed in the liquid but never in contact with the bottom of the cup 98. If desired the sealed vapors within the sleeve may be connected through a conduit 101 to the top of one of the feed tanks 43. The reason for including the sleeves 91, rather than placing the fume seals directly adjacent the control valves, is to elevate the seals so that any abnormal and sudden discharges of inflammable vapor through the seals will be vented to atmosphere at points where ignition is extremely unlikely.

In operation, each control valve has three stopping positions, viz: (1) full flow, (2) dribble flow and (3) completely closed. The dribble flow position is one in which the valve unit 92 is but slightly open, as in Fig. 9. Fig. 10 shows a valve fully closed. Figs. 1 and 11 show a valve fully opened, this position of course being attained when the corresponding cam 80 has the high point of its enlargement 96 disposed upon the roller 84. When the smaller, substantially circular portion of the cam 80 faces its roller 84, the corresponding valve may be either fully seated or partially open in "dribble position," depending upon whether the associated solenoid device (FS or DS) is energized. These solenoid devices cooperate with the levers 85 through individual trigger latch mechanisms, as follows.

With reference to Figs. 5, 9 and 10, the free end of each lever 85 carries a roller 102 and, just above and to one side of said roller, the lever has a plate 103 secured thereto. These elements are designed for coaction with a roller 104 carried by one arm of a bell crank 105 which is mounted on a fixed pivot 106. The plate 103 is adjustable manually by adjustment screws, as shown in Fig. 8, to properly locate said plate to guide the roller 104 for contact with roller 102. The crank has a pin 107 on its other arm slidably received in the slot of a slotted link 108, the latter being pivotally suspended from the outer end of a solenoid core 109. The elements 102 to 106 form a trigger latch; and the elements 107 to 109 coact with a solenoid coil to form one of the solenoid devices (FS or DS). Energization and deenergization of the four solenoids is accomplished individually by movements of the beams of the dual scale system, yet to be described, through mercury switches. The switches for the feed solenoids will be designated FSS and those for the discharge solenoids, DSS.

As shown in Fig. 9, the lever 85 is tending to rise, as permitted by the cam 80, but in so doing its roller 102 and its plate 103 have pocketed the roller 104 so that the roller 102 can rise no farther. The solenoid device is in deenergized condition. The valve 60 is "dribbling." Upon energization of the solenoid device FS through the switch FSS as shown in Fig. 10, the core 109 moves to pull the pin 107 upward by the link 108, thus swinging the bell crank 105 and releasing its roller 104. The valve unit 92 therefore is permitted to seat fully, with lever roller 84 riding upon or closely approaching the reduced area of the cam 80. The latch and solenoid elements are shown more in detail in other views, described later, and it will then be seen that manual adjustment of the plate 103 toward and from the roller 102 will vary the sensitivity of the trigger action. The discharge valve actuating mechanism corresponds with that just described, differing therefrom only in the timing of its cam and switch operation, as brought about through scale operation. The twin scale systems are constructed as follows.

Each weigh tank 42 is mounted on a set of weighing levers in which a multiple beam system is incorporated. With particular reference to Fig. 5A, each tank 42 is rigidly secured to a pair of vertical members 112 and a similar pair of vertical members 113. Each member 112 is pivotally pinned to an intermediate portion of one of a pair of main scale levers 115, which at one end have fulcrums at 116 on the framework, and which at their other ends are shackled together and to the lower end of a link 114, as shown. The other members, 113, are pinned at their lower ends to intermediate portions of a pair of levers 117 that have fixed fulcrums 118 at one end. The other ends of levers 117 are shackled to the centers of the levers 115, as shown. The tank thus is well balanced for vertical movement substantially parallel to the link 114 upon which it is, in effect, suspended.

The upper end of the link 114 is pivotally shackled to a short lever 120, one end of which has a fixed fulcrum at 121 and the other end of which is pivotally supported at 122 on the lower end of a substantially vertical and floating bar 123 comprising a pair of parallel rods 124 interconnected by three short horizontal cross members 125 (see Fig. 5). The lowermost cross member carries the pivot 122; the intermediate cross member is engageable at its bottom with a pivot pin 126 carried by one end of a "weigh" beam 127; and the uppermost member 125 rides upon a pin 128 carried by one end of a "tare" beam 130.

Intermediate its ends the weigh beam 127 has a frame-supported fulcrum 131, and likewise the tare beam 130 has a fulcrum 132. The free end of the weigh beam carries a variable weighted pan assembly 133; and the free end of the tare beam carries a smaller weighted pan assembly 134, likewise variable. The opposite end of the weigh beam also projects beyond the pivot 126 to receive a constant weight 135 which, were the weight 133 removed and the pin 126 eliminated, would precisely balance the beam on its fulcrum pivot.

As a preferred example, the total ratio between the fulcrums 116, 118 and the link 114 may be 10 to 1; the short lever 120 may have a ratio of 4 to 1; and the tare and weigh beams may have a ratio of 5 to 1—thus making the total ratio of the scale system 200 to 1. As shown in Figs. 1 and 5 each pair of scale beams 127, 130 together with electrical mechanisms associated therewith and yet to be described is disposed within a box 136, atop which is mounted a smaller box 137 that houses a tolerance mechanism subsequently described as an "over-under" device.

In the preferred mode of operation each tare beam 130 of the twin scales is so weighted and mounted that it balances its corresponding weigh tank 42 plus a permanent liquid tare or residue. That is, neglecting temporarily the action of the corresponding weigh beam 127 (and the latter is actually taken off the system periodically so that its action can be thus neglected) the tare beam will be in horizontal balance on its fulcrum when opposed by the mass of a tank 42 containing a predetermined amount of permanent tare. This permanent tare in the case of a fluid such as gasoline may be pure liquid, and in the case of a fluid of high viscosity, such as oil, may be partly liquid and a scum or film on the bottom surfaces of the tank. Presence of a permanent liquid tare ensures uniformity of tare for successive weighings.

In further clarification of the above it should be stated that the permanent tare is augmented for each weighing by adding liquid to the tank 42 through its feed valve 60 until both the weigh beam 127 and the tare beam 130 are in balance, and thereafter discharging the liquid through valve 61 until a point is reached where only the tare beam is balanced. Just prior to attainment of this point the weigh beam is lifted off the scale system by mechanical means about to be decribed.

As an example, a permanent liquid tare of 1,000 pounds can be attained by using a mass of 5 pounds in the tare beam weight pan assembly 134 (with scale beam ratio 200 to 1), and weighed or measured liquid units consisting of 5,000 pounds each can be attained by using a mass of 25 pounds in the weigh beam weight assembly 133. In full balance then, the tank contains 6,000 pounds of liquid, and only 1,000 pounds in empty balance.

The mechanisms for timing the valves 60, 61 for each scale system and for lifting its weigh beam into inaction at proper intervals, comprises the following parts (see Fig. 5, and Figs. 15–18).

The motor driven shaft 83 is connected to a timing shaft 140 through a pair of gear boxes 141 and 142 interconnected by a shaft 139 so that both shafts rotate in unison. Secured to shaft 140 is a crank arm 143 which, through a connecting rod 144, actuates a vertically slidable cross-head 145. The latter is disposed below the free end of the weigh beam 127 and it rises to engage and lift—or rather prevent downward swinging of said beam—just prior to the time that a full unit of liquid has passed through the valve 61. To accomplish this the crank 143 must bear the proper relationship to the cam 81, and the solenoid device DS must be timed correspondingly.

The shaft 140 extends into a recorder 146 to count and record the weighing cycles in obvious manner, and between its ends it is connected by a chain 147 to a short shaft 148 to drive the latter at the same speed. This shaft 148 extends into a box 150 within which it carries, for unitary rotation, a set of six timing cams $C_1$, $C_2$, $C_3$, $C_4$, $C_5$ and $C_6$, respectively, associated with a corresponding number of individual mercury switches $CS_1$, $CS_2$, $CS_3$, $CS_4$, $CS_5$, and $CS_6$ (Figs. 15–18). Each switch has a pivot 151, and a follower 152 designed to ride upon the corresponding cam surface to cause periodic openings and closings of the switch. This group of switches is connected in circuit with the scale motor SM to cause the latter to run intermittently under proper conditions, as will be more clear upon subsequent discussion of the circuit diagram of Fig. 34.

Figs. 15 to 18 illustrate several positions of the beam lift crank 143 and the sets of cam switches $CS_1$ to $CS_6$, relative to each other and the several principal scale positions, as follows:

Fig. 15—full flow feed to tank 42 through its valve 60;

Fig. 16—tank 42 full and beams 127, 130 in balance;

Fig. 17—full flow discharge from tank 42 through its valve 61; crank 143 about to remove weigh beam from system;

Fig. 18—tank 42 empty except for permanent tare; tare beam 130 in balance, with weigh beam inoperative due to position of crank 143.

The dribble flow positions of the valves 60 and 61 are directly controlled by the solenoid switches, FSS and DSS respectively, through movement of the scale beams 127 and 130 respectively, and not by the switches just described. With reference to Fig. 5, each feed solenoid switch FSS is mounted in an oscillatable casing 154 that has a fixed pivot at 155 and that normally is in balance with a lever 156 to which it is connected by a link 157. The lever has a fixed pivot 158, a depending slotted link 160, and an adjustable balancing weight 161. The weigh beam 127 has a pin 162 projecting freely into the slot of link 160 so that an appreciable predetermined upward or downward movement of the beam will cause the link to be picked up and the casing 154 oscillated correspondingly. The switch FSS is so mounted (see Figs. 19–24) as to be opened or closed respectively upon predetermined downward and upward movements of the beam 127. Intertied mechanically with switch FSS is a discharge switch DIS which opens and closes simultaneously therewith.

A similar group of switch actuating parts, which may be referred to briefly as coacting elements 163 to 171 (Fig. 5), is associated with the tare beam 130 and designed to open and close the discharge solenoid switch DSS upon predetermined movements upwardly and downwardly, respectively, of said beam (Figs. 19–24). This switch DSS is intertied mechanically with a feed switch FIS which opens and closes simultaneously therewith.

A somewhat detailed reference to the circuit diagram of Fig. 34 may be helpful at this point. This diagram incorporates electrical devices of both sides of a twin scale system, and hence, where duplicate parts are found in each side they are distinguished on the diagram by addition of the suffixes "A" and "B" respectively. For example, the scale motor SM of Fig. 5 is designated SMA on one side, and SMB on the other. It should be understood that the A and B parts are identical, except for location. The diagram of Fig. 34 is shown for simplicity as a single circuit embodying both the motors and the controlling and signaling devices, whereas in actual practice the several scale and pump motors SMA, SMB, OPM and DPM usually will be disposed in a separate three-phase system under control of the branches and devices connected to the two-wire supply line 172, 173.

A pair of wires 174, 175 is connected to the main line so that the latter may lead to one side (A) of the dual scale system and the former may lead to the other side (B). Reading upwardly from the bottom of the diagram, there is but a single discharge pump motor DPM, under control of the automatic switches $DP_1$ and $DP_2$, the latter serving to stop the pump motor when liquid in the tank 41 has receded to a point below which the pump would need re-priming, and a manually operable residue switch DPR; a single siren OS and a single signal light OL, both operable by the automatic overflow light switch OLS; and a single overflow pump motor OPM, with its signal light OPL, both operable by the automatic switch OPS and also by the manually operable residue switch ORS. The remaining parts, with the exception of a time delay coil TDC and a group of switches TDS, CHD, CHF, FRS and "Test"—which are common to the two sides of the diagram—are duplicated, with one set on the A side and the other on the B side.

The purpose of the time delay mechanism, comprising the coil TDC and the double contactor switch TDS, is to give the scale systems plenty of time to reach a balance before continued operation of the scale motors is permitted. Any suitable form of device may be used for this purpose, a preferred type being that available on the market under the name "Microflex" and manufactured by the Eagle Signal Corporation of Moline, Illinois, under U. S. Patents Nos. 1,383,533, 1,460,707, and 1,794,762. It is a synchronous motor driven time relay relay with time adjustment and consisting, basically, of a contact-operating mechanism driven by a motor through an electro-magnetic clutch—the action being automatic, requiring only the closing or opening of a control circuit to initiate or terminate a cycle of operation. This mechanism per se forms no part of the present invention and hence is not fully disclosed in all detail.

The coil TDC is connected in series with a pair of switches labeled "Over A" and "Under A," and with a second pair labeled "Over B" and "Under B," said switches forming part of the previously mentioned tolerance devices which ensure weighings within predetermined limits of accuracy. One side of the switch TDS is connected to the constant head discharge switch CHD which in turn is in series with the constant head feed switch CHF. The "Test" switch is a normally closed manual switch. FRS is a normally open feed residue switch that may be manually closed to completely empty the feed tanks. The other side of the switch TDS has connections, respectively, with the cam switches CS₅A, CS₅B and CS₆A, CS₆B, whereby the twin scale systems are electrically interlocked.

Manually operable starting switches, ESSA and ESSB are shunted around the time delay and interlocking switches to connect the scale motors SMA and SMB, respectively, directly with the switch CHD. Each motor has a holding coil (HCA or HCB) which is operable to close a holding contactor (CA or CB) upon closure of one of the starting switches (ESSA or ESSB). The holding contactors are in branch lines with the A and B groups respectively of the group of switches FIS, DIS, CS₁ and CS₃. As shown, other branch lines include the CS₂ and CS₄ cam switches, feed pendulum switches FPSA and FPSB and discharge pendulum switches DPSA and DPSB. The manner of automatic actuation of the FPS and DPS switches is subsequently set forth.

The four valve trigger solenoids are differentiated in Fig. 34 by combining their general reference number 110 with appropriate legends (FSA), (FSB), (DSA) and (DSB).

The lamps BLA and BLB are in series with the respective A and B over-under switches and hence are lighted to indicate balanced scale conditions when said switches are closed. Feed lights FL (A and B) are controlled by switches FLS (A and B)—as by actuating the latter from the feed valve rods—to indicate that the weigh tanks are being fed. In like manner, discharge lights DL (A and B) are controlled by switches DLS (A and B), actuated by the discharge valve rods, to indicate that the weigh tanks are discharging.

As shown in Fig. 5, and in Figs. 19 to 24, each switch DPS consists of an encased mercury switch that is secured to one arm of a rigid bell crank 180. The bell crank has a fixed pivot at 182 and carries a roller 183 adjacent the switch for coaction with the upper edge of the tare beam 130. The roller is urged toward the beam by a weight 184 secured to the other arm of the bell crank. In rising, the tare beam picks up the roller and, in its uppermost position (Fig. 22—full flow discharge from weigh tank) it has oscillated the crank sufficiently in one direction to open the switch. In all other beam positions the switch is closed. A stop 185 limits the oscillation of the crank by the weight in the opposite direction.

In a similar manner each member FPS comprises an encased mercury switch carried by a rigid bell crank 186 that has a fixed pivot 187, the crank arms carrying a roller 188 and a weight 189 respectively. A stop 190 limits oscillation of the crank under influence of the weight in one direction. Oscillation in the other direction is effected by the weigh beam 127 which, in swinging downwardly, engages the roller 188. The switch is open only when the beam is in or immediately adjacent its lowermost position (Fig. 19—full flow feed to empty weigh tank).

It may be helpful to the reader at this point to describe briefly the conditions of the scale system corresponding to the beam and switch positions illustrated in Figs. 19 to 24:

Fig. 19—weigh tank 42 empty and feed valve fully open; switch FPS open, and cam switches CS₁ to CS₆ as in Fig. 15;

Fig. 20—weigh tank nearly filled and feed valve in dribble position of Fig. 9;

Fig. 21—weigh tank full with beams in balance; switch FSS just closed to permit feed valve to close fully; cam switches disposed as in Fig. 16;

Fig. 22—weigh tank discharging with discharge valve fully open; switch DPS open; cam switches as in Fig. 17; weigh beam 127 lifted off scale system by crank 143 to separate the elements 125, 126;

Fig. 23—weigh tank nearly empty with discharge valve dribbling; weigh beam still off the scale system; and Fig. 24—weigh tank empty except for permanent tare; tare beam balanced; weigh beam about to be permitted to return to operative position; cam switches as in Fig. 18.

The driving arrangements and valve operating mechanism of Figs. 6 to 8 are essentially no different from the showing of the same in Fig. 5, but Figs. 6 to 8 illustrate the actual details of a commercial embodiment. Instead of driving the cam shaft 83 directly from the speed reducer 82 as in Fig. 5, a chain 191 and appropriate sprocket wheels are utilized to interconnect shaft 83 and a short shaft 192 that projects from the speed reducer. The shaft 83 is fully supported on the frame by a plurality of spaced bearings 193. The apparatus of Figs. 5–8 is duplicated for a twin-scale system having sides A and B, as aforementioned.

Operation

The operation and cooperation of the apparatus and electrical devices thus far described is as follows, beginning with an assumed condition that all tanks are entirely empty.

Before pumping liquid to the feed tanks 43, both feed valves must be closed, so that each is ready to open and feed to its respective weigh tank 42. The scale beams at this time are disposed as in Fig. 19, with all three switches connected to the weigh beam broken but with all three switches connected to the tare beam in contact. Referring to Fig. 18, the switch CS₁ is closed. The scale will not operate under these conditions until: (a) the level of liquid in the feed tanks reaches a predetermined height to close the constant head feed switch CHF; (b) there is enough room in the receiving tanks 41, as determined by the constant head discharge device CHD, for the discharged weighings. When such conditions exist, as shown by suitable indicators, and the "Test" switch is closed, the empty starting switch ESSA for the A side of the system may be manually pressed, whereupon the motor SMA starts and the holding coil HCA will be energized to close the switch CA. When the switch ESSA opens upon release of manual pressure, the motor nevertheless continues to run because of the circuit established through switches CA, FISA and CS₁A. The latter switch breaks, however, after approximately ¼ revolution of that cam shaft 83 which is driven by the motor SMA; and any suitable braking means—electrical or mechanical—may be provided to ensure quick and accurate stopping of shaft rotation when the motor is deenergized.

By the above operation the feed valve 60 of the A side is placed in fully open position by one of the cam enlargements 96, and the corresponding weigh tank is being filled rapidly. After about 85% (not including tare) of a predetermined load of liquid is within this tank the corresponding weigh and tare beams come to the dribble position under the influence of the feed pendulum weight 189 (see Fig. 20), but before this weight comes to rest on its stop 199 the mercury switch FPSA makes contact. It should be noted here that before the motor SMA stopped on its initial movement (before CS1A broke), switch CS2A made contact (Fig. 15); and that when FPSA now makes contact it completes a circuit which starts the motor and turns the cam shaft 83 another ¼ revolution (until CS2A breaks) to place the feed valve in dribble position (Fig. 9). Before CS2A breaks, however, CS3A and CS5A are made (Fig. 16) for the next part of the weighing cycle.

As soon as the remaining 15% of liquid enters the weigh tank, the beams 127 and 130 come up to full balance (Fig. 21), and, in doing so, cause the switches FSSA and DISA to make contact. FSSA thereby energizes the solenoid 110 (FSA), which then trips the trigger rollers 102, 104 and permits the feed valve to close fully, as in Fig. 10.

The operator now presses the empty starting switch ESSB to start the B side of the system—the scale motor SMB and other parts going through the phases above described for the A side, so that the other weigh tank is loaded. The scale system is now primed and will operate automatically as long as there is a sufficient supply of liquid. Status of system at this point:

1. Both weigh tanks carry full balanced weighings.
2. Sides A and B not yet properly synchronized.
3. Beams as in Fig. 21.
4. Cam switches as in Fig. 16.
5. Over-under switches A and B closed by attainment of balance, as explained later.

Upon attainment of the above conditions a circuit is produced through the over-under switches A, the timer coil TDC and the over-under switches B. The timer has been set previously to operate with a predetermined time delay, upon the expiration of which the double contactor switch TDS is snapped to the closed position illustrated in Fig. 34; and as the CS5 switches are already closed while the CS6 switches are open the only possible motor operating circuit is through the A side. However, immediately that the motor SMA starts, the contactor CA is closed to ensure continued operation through a circuit including the closed switches CS3A and DISA. CS3A breaks after ¼ revolution of the cam shaft, and during this movement the discharge valve 61 on the A side was moved to fully open position. Breaking of CS3A stops the motor because the initial circuit through the CS5 switches and TDS is also now open (see Fig. 17). Just prior to breaking of CS5A, switch CS4A was closed.

Heretofore no mention has been made of the movement of the beam lift crank 143 and its actuated crosshead 145 as the latter has done no work. It has simply followed the weigh beam (Figs. 19–21) without touching it except in Fig. 19 where it served as a stop for the beam on full flow feeding. But now it does some work in that it lifts the weigh beam (side A) to free it from the system and thus impose the whole load on the tare beam 130 during the weighing out or discharge of liquid into the receiving tanks 41 (Figs. 22 and 23).

The discharge valve is fully open, and after approximately 85% (not including the permanent tare) of the liquid is discharged from the weigh tank, the tare beam comes to its dribble position (Fig. 23) under the influence of the discharge pendulum weight 184. Before the latter engages its stop 185, the switch DPSA makes contact, establishing a circuit by way of CS4A to the motor SMA and its coil HCA. Switch CS4A breaks after the motor has turned the cam shaft another ¼ revolution, and the motor then stops because—FISA and CS3A being broken—the contactor CA is unable to establish an independent circuit for the motor. The discharge valve now is in dribble position, held there by the roller trigger. Just before CS4A breaks, switches CS1A and CS6A make contact for the next operation. When the remaining 15% of the liquid (not including tare) is discharged from the weigh tank, the tare beam 130 comes to balance (Fig. 24) and in doing so it causes switches DSSA and FISA to make contact. This actuation of the discharge solenoid switch (DSSA) causes the solenoid 110 (DSA) to trip the trigger and fully close the discharge valve 61 of the A side.

Status of scale at this point:

1. Sides A and B of the scale system properly synchronized, the two weigh tanks of the sides being in empty balance and full balance, respectively.
2. Scale beams of side A as in Fig. 24; those of side B as in Fig. 21.
3. Cam switches of side A as in Fig. 18; those of side B as in Fig. 16.

Now that the scale is synchronized, each side is 180 degrees out of phase with the other. With CS5B and CS6A in contact and if switches CHD and CHF are in contact, any closure of the double contact switch TDS now will make a circuit not only through the A side of the scale as in the previous operation but also through the B side, thus keeping the system in correct synchronism during further operation—that is, causing the sides to alternate on feeding and discharge, with the weigh tank of one being fed while the other weigh tank is discharging. Repeated cycles are as above outlined, with the CS5 and CS6 switches serving to maintain the synchronism. The timer TDC is energized only when the over and under switches are closed on both sides of the system, thus making continued operation impossible if the scale should weigh for any reason outside a predetermined guaranteed accuracy. Upon correcting the error by bringing the scale to balance or by pressing both of the empty starting switches, ESSA and ESSB, the scale will again go into automatic operation.

From the foregoing, it will be seen that the cam switches give a timing or sequence effect to the controls preparatory to closing the various circuits to the motor, and the beam controlled switches FSS, DIS and DSS, FIS complete the circuits as the weighing action is partially completed and again when completed. It will be noted from Fig. 34 that the cam switches CS5 and CS6 are in duplicate and designated CS5A, CS5B and CS6A and CS6B, those with the suffix A being operated by the A side of the system and those with the suffix B being operated by the B side of the system. By following the circuits, it will be seen that switches CS5A and CS5B operate to energize motor SMA only and that switches CS6A and CS6B operate to energize the motor SMB only. The mechanical relation of the switches CS5A and CS6A to the valve cams 80 and 81 on the A side of the system is the same as the mechanical relation of the switches CS5B and CS6B to the corresponding valve cams on the B side of the system. If, by some manipulation, switches CS5A and CS5B were both closed, switches CS6A and CS6B would be open. Complete closing of both motor circuits would then be impossible since, starting at line 172 and proceeding through coil HCA to switch CS₅A, a circuit parallel therewith will be closed through the closed switch CS₅B, and energy would be supplied to motor SMA. Starting with the line 174 and proceeding through coil HCB to switch CS₆B, this switch and also switch CS₆A would be open so that motor SMB would not be energized. Switches CS₅A, CS₅B and CS₆A and CS₆B thus serve to assist in properly interlocking the twin system electrically.

When it is desired to make a test weighing, the normally closed "Test" switch is opened. If this is done during the process of a weighing the scale will not be interrupted, but after it has finished that particular weighing it will pause as long as the "Test" switch is open, holding a full balance in one tank and an empty balance in the other. Full automatic operation will be resumed upon closure of the "Test" switch.

If at any time during a run the liquid is pumped from its source to the feed tanks faster than the weigh tanks can take it away, the feed tanks will overflow into the overflow tank 44. If a certain level is reached in the latter, float switch OPS makes contact and starts the motor OPM, at the same time lighting the red lamp OPL. If the overflow continues so rapidly as to raise the level considerably higher, float switch OLS closes and sounds the siren OS, while also lighting the danger signal lamp OL.

If at the end of a run it is desired to empty the system and the head of liquid in the feed tanks 43 is below the level required to maintain switch CHF closed, the overflow residue switch ORS is made, starting the overflow pump motor OPM for the purpose of returning any liquid in the overflow tank 44 to the feed tanks. If no overflow occurred, or there is insufficient overflow liquid to close CHF, the feed residue switch FRS is manually closed. Thereupon, if the level in the receiving tanks is low enough to close CHD, the scale will operate until it has completely emptied the feed tanks.

*Over-under devices*

Each side of the scale has associated therewith one of the boxes 137 (Fig. 5) containing the tolerance mechanism that actuates one of the pairs of over and under switches (Fig. 34), all as previously explained in a general way. One of these mechanisms now is described in detail, with particular reference to Figs. 25 to 33.

A spindle 195, journaled in the box 137 in any suitable manner, carries a plurality of parts some of which are free to rotate independently of the spindle and others of which are secured thereto. The secured parts include a collar 196 united to a plate 197 that carries the over and under switches, shown structurally in Fig. 25 as mercury switches 198 and 199 respectively. A pair of horizontal arms 200, 202 form rigidly aligned extensions of the collar 196—arm 200 carrying a pivotally suspended link 203, and arm 202 carrying a mass 204 that is adjusted to serve as a counterweight for the link. The lower end of link 203 has a vertical slot 205, so disposed when the arms 200, 202 are in horizontal balance that the center of the slot is disposed to surround a pin 206 whenever the tare beam 130—to which the pin is secured—is in perfect balance. (The weigh beam 127 could carry the pin, but as said beam is sometimes off the scale system, it is preferred to utilize the tare beam for this purpose.)

Should the tare beam, when weighing liquid, fail to come to balance at the proper time within a weighing tolerance determined by the length of the slot 205 and the angles of inclination of the mercury switches 198, 199 with respect to their plate 197, one or the other end of the slot will be in engagement with the pin and will have shifted the latter vertically in one direction or the other to open one of the switches. A pointer 207, secured to the front end of the spindle, cooperates with a scale 208 to show whether the unit volume of liquid is overweight or underweight, and the extent of the error. Normally, of course, the weighings will be accurate within the prescribed tolerance. In the event of occasional error, however, any one of the four switches ("over"—A and B, and "under"—A and B) will prevent continued operation of the system, as previously explained with reference to Fig. 34.

The complete over-under mechanism is more than an indicator and switch operator. It includes, between the collar 196 and the pointer 207, means acting as compensation on the beam system and steadying the tare beam. This means includes a pair of dash pots 210 filled with a special oil and secured to the bottom of the box 137 at opposite sides of the spindle 195. These dash pots do not act upon the beam system at all times, for if they did, the beam movement would always be retarded, which would be undesirable because the tare beam must swing quickly and freely from its dribble positions (Figs. 20 and 23) to the balanced position in order for the weighings to be correct.

Each dash pot receives the lower end of a rod 212, to which it is fluid-coupled by a disc 213 that normally rests upon a nut or integral enlargement 214 of the rod. The disc fits the rod very loosely, as shown (Fig. 28), and has a clearance of about ⅜₄ inch with respect to the inner cylindrical wall of the dash pot. Therefore, the dash pot is single acting, imposing resistance to rod movement upwardly but permitting the rod to move freely and rapidly in a downward direction in advance of its disc. The latter, of course, sinks to follow the enlargement 214.

The upper end of each rod is pivotally connected to an arm 215 that is securely joined to a collar 216 that has an internal bearing 217 by which it is anti-frictionally mounted for oscillation on the spindle 195. Each collar 216 rigidly carries a second arm, 218, in alignment with arm 215 and provided with an adjustable counterweight 219; and a third substantially vertical arm 220 carrying a pendulum mass 222 that tends to maintain the aligned arms 215, 218 in horizontalism. The lower end of each arm 220 is engageable with an adjustable stop pin 223.

The parts just described will occupy the position illustrated in Figs. 25 and 26 unless oscillated to other positions by an operating member 224 that is secured to the spindle 195. This member has two actuating fingers 225, arranged so that in one direction of spindle rotation only one collar 216 is oscillated and that in the other direction only the other collar is oscillated. The fingers carry adjustable pins 226 which are engageable with the arms 220 to cause the oscillation just mentioned.

Assuming that one of the weigh tanks is full and its corresponding scale beams balanced as in Fig. 21, the over-under device will occupy the balanced position shown in Figs. 25 and 26. Upon discharging the liquid, the tare beam will go to the position of Fig. 22 and the over-under device to that of Fig. 29 because the pin 206 travels to the end of slot 205 to force the link 203 upwardly. When the beam moves to the dribble position (Fig. 23), the over-under device follows, dropping a little from the position shown for the full flow in Fig. 29. The device is now ready to play the part for which it was designed. It had to go through the movements just described because of its connection with the scale beam system.

As the empty balance is reached the tare beam swings from its position of Fig. 23 through the level or balanced position of Fig. 30 to that of Fig. 31 where the particular dash pot seen in the latter view is ready to retard the momentum gathered by the swinging beam. Fig. 32 shows this dash pot in action, retarding the beam. Hence the distance that the beam drops below the level or balanced position is less than the distance through which it dropped in going from the dribble to the balanced position. Due to this shortened distance, the beam gains very little momentum when it swings back to the level position of Fig. 33, and therefore comes to rest very quickly (within 3 to 5 seconds after the end of the dribble flow). If on its return stroke upward the beam has enough momentum to pick up the loop of the link 203, it is retarded by the dash pot shown in Figs. 29 and 30 because by this time the disc 213 of that pot has settled into contact with the shoulder 214.

If the side of the scale system under discussion discharges the proper amount of liquid, the scale beam balances perfectly, with pin 206 oscillating within the slot 205 without picking up the link 203 as the beam comes to rest. However, if a slight excess of liquid is discharged there is an insufficient permanent tare remaining in the weigh tank, and the tare beam drops below level, picking up one of the arms 220 (Fig. 32) and therefore lifting the corresponding pendulum weight 222. The tare beam drops to a point where said pendulum weight counterbalances it. Simultaneously the "over" switch 198 is broken to open the circuit as previously explained.

Similarly, if the liquid discharged is below the prescribed amount, and beyond the tolerance allowed for error, the tare beam rises or remains above its level position, with the pin 206 in contact with the upper end of slot 205 and holding the pendulum weight 222 of Fig. 29 in elevated position. The height of the beam is limited by the counterbalancing or error-compensating action of this pendulum weight.

The over-under device functions in a similar manner during the operation of feeding a prescribed amount of liquid to the weigh tank and therefore a further detailed account seems unnecessary.

Float operated switch

The various float operated switches CHF, CHD, etc. may be of any suitable design, but a preferred form, especially adapted for safety and durability in the handling of combustible liquids and oils, is shown in Figs. 13 and 14. The illustrated device may represent, for example, the constant head feed unit CHF, previously described in a general way. It comprises a pair of complemental housing members 230 and 232 secured together to compress the edge portion of a sheet 233 of gasoline and oil resistant material, such as Thiokol. The liquid connections 71 are made to the member 232 which, with the sheet 233 forms a chamber for a sealed, hollow, copper float ball 234.

The sheet 233 is centrally attached, by a sealed joint 235, to the lower end of a rod 236 that is pinned at its upper end to a crank 237. The latter is secured to a spindle 238 that extends externally of the housing through a sealing bushing to receive one end of an arm 239. This arm is secured to the spindle so that it oscillates in response to rising and falling movements of the float ball. The other end of the arm is pivotally connected to a link 240 for interconnecting it and a switch operating arm 242. The latter is secured to a spindle 243 that projects into a sealed, explosion-proof metal switch housing 244 to actuate any suitable switch—preferably a pivoted mercury switch—contained therein in obvious manner. Housing 244 is removably mounted on the housing member 230.

Valve structure

The feed and discharge valves 60 and 61 are of special design for accurately cutting off the flow of a large liquid stream, speedily and without shock. The details of a feed valve are shown in Fig. 11. The only essential difference between the feed and discharge valves is that they seat in opposite directions, and therefore a single illustration will suffice.

The valve structure of Fig. 11 comprises a globe type housing 246 having intake and outlet connections of, for example, 12 inches internal diameter, and having the usual partition 247 for carrying a bronze seat 248. The seat has a beveled surface 249 complemental to a synthetic rubber ring 250 that forms part of the shiftable valve unit 92. This unit comprises upper and lower plates 252 and 253 between which the ring 250 is clamped—these plates being secured to the valve stem 93 by means of a shoulder 254 on the stem and an adjustable nut 255—and an internal dash pot formed as follows.

Plate 253 has an integral sleeve or shroud 256 on its rim that extends downwardly to terminate in an inwardly beveled edge, as shown, and that is provided with a multiplicity of small throughports 257 adjacent the ring. The outer diameter of the shroud is slightly less than the inner diameter of the seat. A disc-like piston 258 cooperates with the plate 253 and its shroud 256 to form a dash pot chamber. Normally the piston is disposed as shown due to the action of a compression spring 259 that acts between the shoulder 254 and a guide hub 260 integral with the piston. The piston is further guided, for reciprocation on the valve stem, by a plurality of studs 262 that are secured to the plate 253. Nuts 263 on the outer ends of the studs serve as stops for limiting separation of the plate and piston.

A bushed sleeve and closure member 265, secured in the bottom of the globe housing serves dually as a guide for the valve stem and an abutment for engaging the guide hub 260 and actuating the dash pot as the valve closes.

In operation, the valve is fully open with the parts disposed as in Fig. 11. In dribble flow position the shroud 256 is near but not overlapped on the seat 248. When the roller trigger is released for full closure of the valve, the shroud quickly passes the beveled surface 249 and cuts the flow. At the same time the guide hub 260 is forced upwardly by the member 265 to squeeze the liquid content of the dash pot outwardly through the ports 257, thus retarding the final speed of the valve and preventing shock. The valve action is rapid and accurate, yet remarkably smooth. The quick-closing effect is augmented by elimination of the usual stuffing glands and substitution of the previously described fume seal for each valve at the top of the machine.

It is to be understood that the disclosed embodiment, although constituting a preferred commercial form, is intended for present purposes to be illustrative and not restrictive. Obviously, many changes in the apparatus and particularly in the component parts thereof may be made without departing from the scope and spirit of the present invention, as set forth in the objects and defined in the appended claims.

What is claimed is:

1. In a liquid weighing apparatus, a container; feed and discharge valves for supplying liquid to said container and for removing it therefrom, respectively; and a scale system comprising a weigh beam and a tare beam associated with said container, and means including an electric motor and switch means therefor governed automatically by the weigh beam for closing the feed valve and opening the discharge valve when said container has received a predetermined mass of liquid and switch means for said motor controlled automatically by the tare beam and for closing the discharge valve when only a predetermined permanent liquid tare remains in the container.

2. In the apparatus defined in claim 1, said feed valve having a connection to the bottom part of the container below the level of the permanent liquid tare, whereby liquid is always fed to said container at a submerged point, and wherein said predetermined mass of liquid is balanced against a known mass.

3. In an apparatus of the character described, a weigh tank, a scale system including said tank as permanent tare thereof, a feed tank for supplying liquid to said weigh tank, a feed valve for controlling the liquid supply from said feed tank to said weigh tank, a second valve for controlling the discharge of liquid from said weigh tank, a third tank for receiving the discharged liquid, mechanism for alternately operating said valves, devices associated with said feed and receiving tanks to prevent operation of said mechanism in the absence of predetermined proper liquid levels therein, and means for stopping said mechanism whenever said scale system fails to come to balance upon closure of one of said valves.

4. In an apparatus of the character described, a weigh tank, a feed tank interposed between said weigh tank and a liquid supply source, means associated with said weigh tank to cause it to pass a series of liquid units of predetermined weight, an overflow tank separate from and independent of said source of supply and connected to said feed tank to receive therefrom liquid in excess of that which can be passed by said weigh tank, and means automatically operable to return liquid from said overflow tank to said feed tank.

5. Apparatus of the character described, comprising a scale system including a weigh tank designed to receive liquid and to move vertically in response to variations in liquid level therein, valves for controlling the flow of liquid respectively to and from said tank, and valve operating mechanism controlled electrically by said scale system and including means for placing each of said valves in a dribble or partially closed position as well as in fully open and fully closed positions.

6. Apparatus of the character described, comprising a scale system including a weigh tank designed to hold liquid and to move in response to variations in its liquid content; means for establishing relatively high volumetric rates of flow to and from said tank, including quickly movable feed and discharge valves and electrically controlled valve mechanism, said mechanism being operative to impart relatively slow opening motion and relatively slow partial closing motion to said valves for controlling the flow and mechanism to allow said valves to quickly snap shut under control of movements of parts of said scale system to predetermined positions; and said valves including means designed to afford rapid cut-off smoothly and without hammer.

7. In an apparatus of the character described, a liquid weighing scale system, a tank mounted upon said scale system for holding liquid being weighed, inlet and discharge valves connected to said tank to pass liquid therethrough, valve actuating devices controlled automatically by said scale system, said valves having casings and operating rods extending upwardly to said devices, sleeves extending upwardly from said valves in fluid communication with their casings and in freely surrounding relation to said rods and to a height above the top of said tank, liquid reservoirs on the upper ends of said sleeves, and inverted cups having fluid-tight engagement with and carried by said rods and movable freely in said reservoirs with their lower edges submerged in the liquid of said reservoirs.

8. In an apparatus of the general character disclosed, a scale system comprising a weigh beam and a tare beam; a container designed to receive and discharge liquid and to balance both of said beams upon receipt of a predetermined liquid mass, and to balance said tare beam alone after discharge of said predetermined mass, and automatic means including a member having a crank for operating it to lift the weigh beam, an electric motor for operating said crank, and electrical contacts for said motor controlled by said scale system for rendering said weigh beam inoperative prior to complete discharge of said predetermined mass.

9. In an apparatus of the character disclosed, a twin system of weigh tanks designed to receive and discharge unit quantities of a substance to be weighed, a movable scale beam system connected to each tank, feed and discharge valves for controlling the flow to and from the tanks, electric motors for actuating said valves, means electrically interlocking said motors for operation in alternate relation to cause feeding of one tank and discharging of the other tank, tolerance mechanisms connected to the respective scale beam systems and carrying electrical switches and shiftable to open and close said switches, a lost motion connection between each beam system and its respective tolerance mechanism, and electrical circuits containing said switches and operative to control said motors to allow feeding of one tank and discharging of the other tank when the scale beam systems have attained a balanced condition, said switches being arranged to be closed within the range of lost motion of said connection but to open—one or the other—when said range is exceeded in either direction of movement of the scale beam system, said electrical circuits electrically interconnecting said tolerance mechanisms in relation to each of the scale beam systems and to each other to prevent continuous operation of said motors if either scale beam system is out of tare or loaded balance.

10. In the apparatus defined in claim 9, each of said tolerance mechanisms being oscillatable and having a level or balanced position corresponding to balanced condition of the scale beam system, and oscillation-damping means associated with said mechanisms and effective to retard rapid movement of the scale beam system beyond balanced condition but ineffective to retard movement of the scale beam system into balanced condition.

11. In apparatus of the character disclosed, a pair of scales for weighing flowing substances; valves for controlling the flow to and from each scale; and means including motor driven cams and a controlling electrical circuit, including electrical devices operable by each scale to start the motor and electrical devices operable by the cams to stop the motor for operating said valves for the respective scale in properly timed relation to each other, tolerance mechanisms controlled by the respective scales, and means interconnecting said mechanisms and controlling said motors to permit or prevent operation of either of the scales according to whether the other scale is in or out of balanced condition within a predetermined tolerance.

12. In a weighing apparatus of the character disclosed, a pair of scale beam systems; weighing containers individual to said scale systems; means including two separate systems of cams each having an individual electric driving motor for controlling the feeding of material to the respective containers and the discharge therefrom; electrical means for causing said motors and their associated systems to operate in alternation, continuously—one feeding while the other is discharging, and vice versa, and means for interlocking each of said motors with the scale beam systems to synchronize the feeding action of one scale beam system with the discharging action of the other scale beam system.

13. In a weighing apparatus of the type comprising twin weighing units including a pair of scale beam systems and weighing containers individual to said systems; a feed valve and a discharge valve individual to each container for supplying material thereto and subsequently removing it therefrom; an individual electric motor and associated mechanism for actuating each pair of valves; switch elements also operable by said motors, further switch elements operable by the scale beam systems, and a controlling circuit for said motors and including all of said switch elements in such arrangement as to interlock the twin weighing units electrically for synchronized alternated weighings.

14. In the apparatus defined in claim 13, each scale beam system comprising a weigh beam and a tare beam designed so that both together can balance the corresponding container when filled with a predetermined load and so that the tare beam alone can balance said container upon discharge of said load; and means operable by the respective motor for mechanically rendering said weigh beam ineffective while the corresponding container is discharging its load.

15. In a weighing apparatus of the type comprising twin weighing units, a pair of scale beam systems; weighing containers individual to said systems; a feed valve and a discharge valve individual to each container for supplying material thereto and subsequently removing it therefrom; an electric motor and associated mechanism for actuating each pair of valves in alternation in a series of opening and closing steps; a cam shaft driven by each motor in timed relation to the valve actuation; a plurality of electrical switches operable by each cam shaft; a plurality of further electrical switches operable by each scale beam system; and an electrical circuit for said motors and including all of said switches in such arrangement that the twin units are electrically interlocked for simultaneous and continuous but out of phase operation, and that each motor runs intermittently in operating its associated valves and cam shaft.

16. In a weighing apparatus designed to handle flowing materials that can be valved, a scale including a beam system mounted to swing in opposite directions above and below a balanced position and designed to attain a balanced condition when subjected to forces created by a predetermined mass of material, valves for controlling the flow of material to and from the scale, means including contacts governed by said swinging beam system and electrical circuits controlled thereby for automatically governing said valves, and means including pendulum weights to respectively apply a force of diminishing magnitude to the beam system in one or the other of said directions to assist the beam system to move toward a balanced position to cause actuation of said valves to reduce the flow of material to and from the scale to a dribble flow as the beam system approaches and prior to reaching balanced condition.

HENRY RICHARDSON.